United States Patent [19]
Shostak

[11] Patent Number: 5,913,029
[45] Date of Patent: Jun. 15, 1999

[54] DISTRIBUTED DATABASE SYSTEM AND METHOD

[75] Inventor: Robert E. Shostak, Portola Valley, Calif.

[73] Assignee: Portera Systems, Campbell, Calif.

[21] Appl. No.: 08/797,811

[22] Filed: Feb. 7, 1997

[51] Int. Cl.$^6$ ....................................................... G06F 15/17
[52] U.S. Cl. ...................... 395/200.33; 707/201; 345/357
[58] Field of Search ......................... 395/200.33, 200.34, 395/200.35; 707/8, 201; 345/356, 357

[56] References Cited

U.S. PATENT DOCUMENTS

| | | |
|---|---|---|
| 5,423,034 | 6/1995 | Cohen-Levy et al. . |
| 5,553,242 | 9/1996 | Russell et al. . |
| 5,615,325 | 3/1997 | Peden . |
| 5,630,125 | 5/1997 | Zellweger . |

OTHER PUBLICATIONS

Vonderweidt, G. et al.; "A multipoint Communication Service for Interactive Applications"; IEEE Transactions on Communications; vol. 39, No. 12; pp. 1875–1885, Dec. 1991.

Yavin, D.; "Replication's Fast Track"; Byte Magazine; pp. 88A–90, Aug. 1995.

*Primary Examiner*—Mark H. Rinehart
*Attorney, Agent, or Firm*—Gray Cary Ware & Freidenrich

[57] ABSTRACT

A distributed data processing system is provided, comprising a server computer and a plurality of client computers connected to said server computer, the interaction of each client computer with the server computer being a separate client session. The server computer may comprise a system for generating a template comprising a graphical representation of a plurality of data structures, the template being selected from one of a shared template and a session template, the session template comprising a graphical representation of data structures containing a data item having a value that is unique for each client session and the shared template comprising graphical representations of hierarchical data structures containing said session data for all of the client sessions, a system for tracking the session data item values for each client session and the shared data item values, and a system for transferring the session template to a particular client computer upon starting of a client session between said client computer and said server computer. Each client computer may comprise a system for displaying said session template, a system for receiving changes to the value of said data on said displayed session template based on user input, and a system for immediately updating the shared data item values in the shared template based on said user changes to the session data item.

15 Claims, 9 Drawing Sheets

DISTRIBUTED DATABASE SYSTEM AND METHOD

BACKGROUND OF THE INVENTION

This invention relates generally to a computer system for processing data and in particular to a distributed computer system such as a client-server system, for processing data.

Computer systems that have distributed data processing capabilities and distributed data storage capabilities are well known. The data may be located, for example, in a single centralized data storage location, or may be distributed throughout a plurality of different storage locations that may be connected together. Some distributed computer systems may have several computers connected to a communications network where the data stored on each computer may be replicated on every other computer so that there are multiple copies of the data distributed throughout the network. The types of data structures used to store the data and the physical locations of the storage of the data vary depending on the particular data processing application. For example, a conventional text searching and retrieval system may have a central computer system that stores all of the data in a central database and a plurality of remote computers connected through modems and phone lines to the central computer. The central computer may execute a software application that permits the remote computers to search and retrieve data from the central computer.

One conventional distributed computer system that features centralized storage of some data and the distributed processing of the data is a client-server computer system. In a conventional client-server computer system, there may be a central computer and one or more remote computers that connect to the central computer. The central computer system may be referred to as a server computer and the remote computers may be referred to as client computer(s) and there may be multiple client computers attached to the server computer. The software applications being executed by the server computer and by the client computer(s) may be referred to as server software applications and client software applications, respectively.

For a data processing client-server system, the traditional server software application may be a "dumb" data repository or database, such as an SQL database, which contains a plurality of data structures, such as tables of data, that may be set up by a database configuration utility. The server software application may accept data manipulation commands, such as SQL commands, from the client computers and respond to those data manipulation commands by either storing data in the database or retrieving data from the database. The server may have some limited application logic for maintaining the integrity of the data stored on the server, but the server may be considered "dumb" because the server software application only performs data manipulation commands and does not perform any other functions, such as generating a graphical user interface or performing mathematical calculations on the data. The server typically may store data shared by each client computer (shared data) while the client computer may store data whose value may be unique to the client computer (session data).

By contrast, a conventional client software application, located on a remote client computer with less processing power and memory than the server computer, may contain most of the application logic for the data processing system. The primary components of the client software application may be a user interface and application logic. The user interface may graphically display the data to the user and update the display of the data when necessary. The application logic may store the session data, may manage communication between the client computer software application and the server, and may implement application commands, such as applying business rules to the data or ensuring that valid data is entered into the system. The communications between the client software application and the server occur as a series of discrete data manipulation commands, known as transactions, wherein the data may be retrieved or stored into the data repository. The goal of a conventional client/server computer system is to perform as much data processing as possible on the client computer, and minimize the transactions with the server so that the server may handle multiple client sessions.

A client computer may be physically connected to the server via a modem and a phone line, for example, and each client computer's logical connection to the server may be known as a client session. There may be multiple simultaneous client computer sessions with a server computer. In these conventional client-server systems, most of the session data that is unique to each client computer may be stored by the client computer and any data shared by all of the client sessions, known as shared data, may be stored in the server's database. The session data may be personal data about a person, while shared data may be a data structure containing every person's personal data. Thus, the shared data and the session data may be separated for each other. In addition, the data structures may be completely separated from the application design because the data structures are generated by, for example, an SQL database utility. The applications, on the other hand, may be accomplished by a completely separate software application, known as a tool. The application logic may process user commands on the client computer and then issue a transaction request when communication with the server is necessary so that a developer of the client/server system must differentiate between access to data local to the client computer and access to shared data on the server.

A conventional client/server computer system may also differentiate between the execution of the client software application and the transactions with the server. The software application on the client computer is executed by logically stepping through a plurality of lines of computer code. Client computer interactions with the server, however, occur only when the client computer requires a piece of shared data and issues a transaction request. To maintain the integrity of the shared and session data, when a transaction is being executed any user commands issued during the execution of the transaction with the server must either be completed or terminated so that the data is not changed arbitrarily. For a traditional client-server system, the developer of the client/server computer system must manually validate assumptions that existed prior to a transaction's execution, such as the value of certain data fields and must then create a test condition that may either proceed with or terminate the execution of a transaction based on the test. If the transaction terminates, then the developer is assured that the shared data has not changed, but must manually reset the session data. Thus, a developer must check to ensure valid data is being used.

As described above, in a conventional client/server computer system, the data repository and the client software application are separate so that there is no explicit link between the data structures located on the server and the client software application. The client software application may include calculated fields based on shared data or session data. The shared data must be manually loaded by the client software application by issuing a transaction request to the server and temporarily storing a copy of the shared data. At this point, the temporarily stored shared data will be treated as session data and accessed by the client software application. The temporary copy of the shared data, however, may be invalidated due to another client computer's interactions with the server in which the value of the shared data changes. Therefore, during any operation that would change that temporarily stored shared data, a transaction is started which revalidates the shared data with the server and generates a transaction failure if the session data is not valid. In addition, if a developer wants to refresh the data on the client computer's screen from time-to-time, the data must be revalidated against the server copy of the shared data from time to time. In addition, if multiple users are looking at the same piece of data, then this revalidation process must occur for each user, which is time consuming. Therefore, calculating values and revalidating temporary copies of shared data is a slow process, but necessary because the shared data and session data are stored separately. The traditional client/server system also does not provide a simple system to calculate a value which depends on other values.

A conventional client-server computer system also requires the developer of the client/server computer system to work in several different programming language environments that require the developer to understand and be able to write software applications in several different programming languages. For example, for a conventional client-server computer system located on the Internet, a developer must understand a database programming language, such as SQL, in order to write the database software application located on the server. The developer must also understand one or more application programming languages, such as PERL, Cobol or C, to write the software application that contains most of the application logic, resides on the server, and may download data to the client computer when the client computer requests the data. The developer must also understand a user interface programming language, such as the hypertext mark-up language (HTML) to write the software application that resides on the server, and provides the user with a graphical user interface to interact with the server computer and the database. Therefore, a developer must understand and be able to write software applications in several different programming languages to produce a single client-server application.

In summary, a traditional client-server system may have shared data and session data stored separately which requires revalidation of shared data temporarily displayed on a client computer through a transaction. The separation of the shared and session data also makes calculations using shared data and updates of those calculations more difficult because the shared data must be retrieved by transaction. In addition, the traditional server may be a "dumb" data repository so that each client computer must execute a large software application. A traditional client-server system also requires a developer of a client-server system to use several different programming languages, and the developer must separately generate the data structure and the client software application.

Thus, there is a need for a distributed data processing system and method which avoid these and other problems of known devices, and it is to this end that the present invention is directed.

SUMMARY OF THE INVENTION

The invention provides a distributed data processing system and method, such as a client-server computer system, which enables a complex client-server application to be generated in a simple manner using a single graphically oriented programming language. In particular, it may enable the generation of the complex client/server system, including data structures, application logic and user interface, using a series of graphical pages connected together by macros. Each page may represent a record that may have a plurality of different data items, and the macros may perform the calculations on the data. The client-server system may automatically generate the necessary data structures to store the necessary data. The shared and session data may be stored on the server.

The invention also provides a distributed data processing system and method in which the traditional server software application and the traditional client software application are unified into an application located on the server having a series of graphical pages. Each page may contain either shared data or session data, and the particular type of data depends on the type of page where the data is located. A small user interface software application may be stored and executed on the client computers. The client-server system may also process all user interactions with the server serially so that reverification of shared data prior to completion of a transactions is not necessary. Due to the serial interactions with the server, the results of a failed transaction with the server are predictable in that the session data and the shared data are known.

The data processing client/server system also provides distributed data processing system in which shared data may be automatically updated because all of the shared data is stored on the server and a copy of the shared data may be cached on each individual client computer, but there is only one logical copy of the shared data. Thus, the cached copies on any client computer may be automatically updated if the shared data changes eliminating the need to revalidate the shared data. The system may also generate a dependency tree so that changes in a piece of shared data that affect other pieces of shared data may be automatically propagated through the database.

The invention may also provide calculated fields wherein, every time that a client computer refreshes its data from the server, the calculated field may be automatically updated by a program fragment attached to the calculated field. A field that calculated a value in a conventional client-server system would require the client computer to issue a new transaction to the data repository every time that an update occurred.

In accordance with the invention, a distributed data processing system and method are provided having a server computer and a plurality of client computers connected to said server computer, the interaction of each client computer with the server computer being a separate client session. The server computer may comprise a system for generating a template comprising a graphical representation of a plurality of data structures, the template being selected from one of a shared template and a session template, the session template comprising a graphical representation of data structures containing a data item having a value that is unique for each client session and the shared template comprising graphical representations of hierarchical data structures containing said session data for all of the client sessions, a system for tracking the session data item values for each client session and the shared data item values, and a system for transferring the session template to a particular client computer upon starting of a client session between said client computer and said server computer. Each client computer may comprise a system for displaying said session template, a system for receiving changes to the value of said data on said displayed session template based on user input, and a system for immediately updating the shared data item values in the shared template based on said user changes to the session data item.

DETAILED DESCRIPTION OF A PREFERRED EMBODIMENT

The invention is particularly applicable to a client/server distributed data processing system that may be used for tracking employee data within a company, such as computing the employment benefits of an employee. It is in this context that the invention will be described. It will be appreciated, however, that the system and method in accordance with the invention has greater utility.

Figure 1:
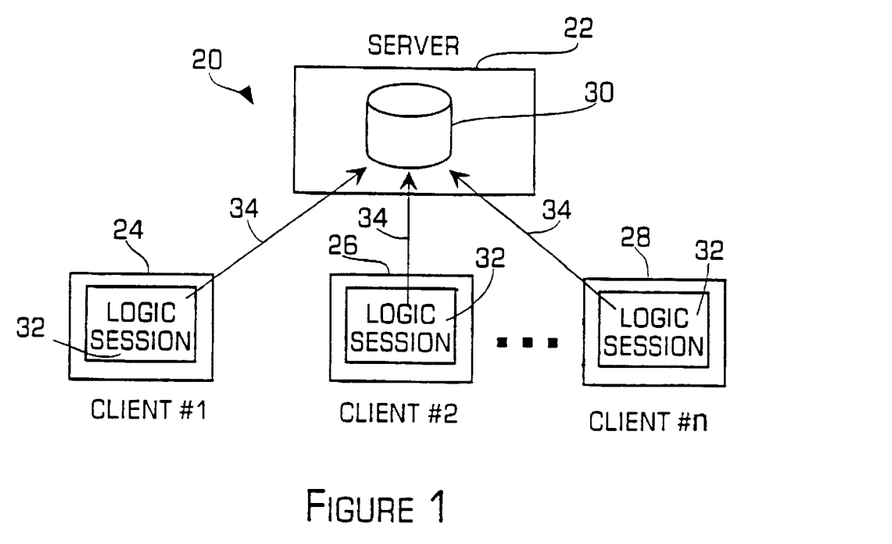
FIG. 1 is a diagram of a conventional distributed data processing system, such as a client-server system.

FIG. 1 is a diagram of a conventional client-server system 20 that may include a server computer 22 and a plurality of client computers 24, 26, 28 attached to the server computer. The server may have a data repository 30, such as an SQL database, that performs simple data manipulation functions, such as saving and retrieving data, and may maintain the integrity of the data located in the database. Only the shared data may be stored in the data repository. The data repository does not have any application logic that permits a user to interface with the server, nor any application logic to perform calculations on the data within the database. The goal of this conventional client/server system is for the client computers to perform a majority of the data processing and limit the transactions between the server and the client computers. Thus, the majority of the application logic 32, known as the client software application, may be located locally on each client computer 24, 26, and 28.

The client software application for each client computer may store the session data for each client computer, may provide the logic to communicate with the server and manipulate the data based on a user's commands, and may provide some form of user interface. Each client computer may be remote from the server and may interact with the server by issuing a transaction 34 whenever shared data is needed by the client software application. Since the majority of the application logic and the session data are located on each client computer, each client computer has a client software application that may require a large amount of memory. These conventional client software applications may be known as "fat" client-server system because the client software applications require a large amount of memory and a majority of the application logic is executed by the client computer.

In operation, a user on a client computer may start the local client application and connect to the server. The "fat" client software application permits the user of the client computer to manipulate both shared and session data, but the shared data must be revalidated prior to use, as described above. The "fat" client software application requires the user of the client computer to install the client software application on the client computer. The manipulated shared data may be communicated back to the server through a transaction so that the shared data in the data repository is updated. If any user commands occur during the execution of a transaction, the data used by these commands must be revalidated prior to use because the shared data on the server may have changed. There is also no system for updating a client computer's copy of a piece of shared data. Now, a distributed data processing system, that may be a client-server system, in accordance with the invention will be described.

Figure 2:
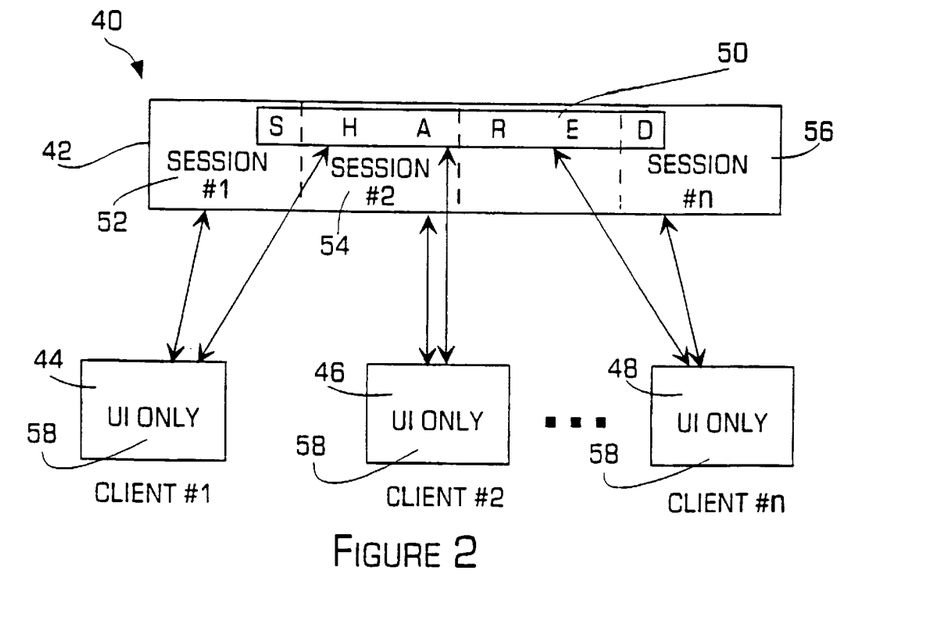
FIG. 2 is a diagram of a distributed data processing system, such as a client-server, in accordance with the invention.

FIG. 2 is a diagram illustrating a distributed data processing system 40 in accordance with the invention. In the embodiment shown, the distributed data processing system may be a client/server computer system. The client-server system 40 may have a central server computer 42 and one or more client computers 44, 46, 48 that may be connected via a telephone line and a modem, for example, to the server. The server computer may support a plurality of simultaneous connections, known as sessions, with a plurality of client computers, such as client computer numbers 1, 2, ... N. In this figure, only client computers numbers 1,2 and N are shown for clarity. At any time, none, some or all of the client computers may be connected to the server and may have a corresponding "client session" with the server computer.

The location of the shared and session data and the data processing program, known as application logic, in accordance with the invention, are different from a conventional client-server system. As described below in more detail, the server computer now stores the shared data as well as the session data and executes a majority of the application logic which significantly reduces the memory size required on the client computers for the client software application. These systems may be referred to as "thin" client-server systems for several reasons. The client software application requires less memory, the client software application does not require installation on the client computer. As described below, the data structures and the application logic both are stored and executed by the server computer which permits a developer of this client-server system to develop the entire client-server system as a complete package. In addition, a developer of a complex client-server system does not have to learn various different programming languages. In accordance with the invention, the entire client-server system may be laid out graphically as a plurality of "pages", as described below, and the system may generate the appropriate data structures connected to the pages generated by the developer. The data structures may store the shared data and session data. The pages also permit the client-server system to provide a separate session page for each client computer. The client-server system may also maintains a data array, as described below, that may keep track of the shared data and the session data for each client computer currently connected to the client-server system.

The server computer 42 may store a shared data item data structure 50 in a database and may also temporarily store a plurality of pieces of session data 52, 54, 56 as described below that may contain data that is unique to each client computer. As described below, the application logic that may display the shared data and the session data to the client computers may be a server software application that generates one or more graphical pages for each client computer. Shared data may be located on a shared page that each client computer may not view, and session data may be located on a session page, wherein each session page has the same data structures, but the values of the data may be different for each client computer, as described below with reference to FIG. 3. The shared data item may be a data structure that stores all of the session data similar to a conventional data. A macro, may be built into a data structure or into a page and may perform some operations or calculations based on either the shared or the session data. There may also be a calculated field that may, for example, calculate an average value based on the shared data and periodically update that value if any shared data changes every time that the client computer refreshes its own information. A macro attached to a session page may immediately update the shared data to reflect any changes made to any session data during a client session. An example of a client-server application in accordance with the invention will be described with reference to FIGS. 7–10.

Each client computer 44, 46, 48 may have a software application being executed that may be a user interface application only, such as a JAVA-based user interface, which significantly reduces the memory required to store and execute the client software application. This type of reduced memory client software application may be known as a "thin" client software application. Thus, as described above, due to the thin client software application, the shared and session data and the application logic that manipulates the data may all be stored on the server. The storage of all the data and the application logic on the server provides several advantages. First, the client software application requires less memory. Second, no revalidation of shared data through transactions is required because the server may automatically validate shared data items using the data array and a macro. Third, a developer may create a complete client-server application, including the shared and session data structures, the application logic and the user interface using a single graphical development environment. Now, the architecture of the client-server system in accordance with the invention will be described in more detail.

Figure 3:
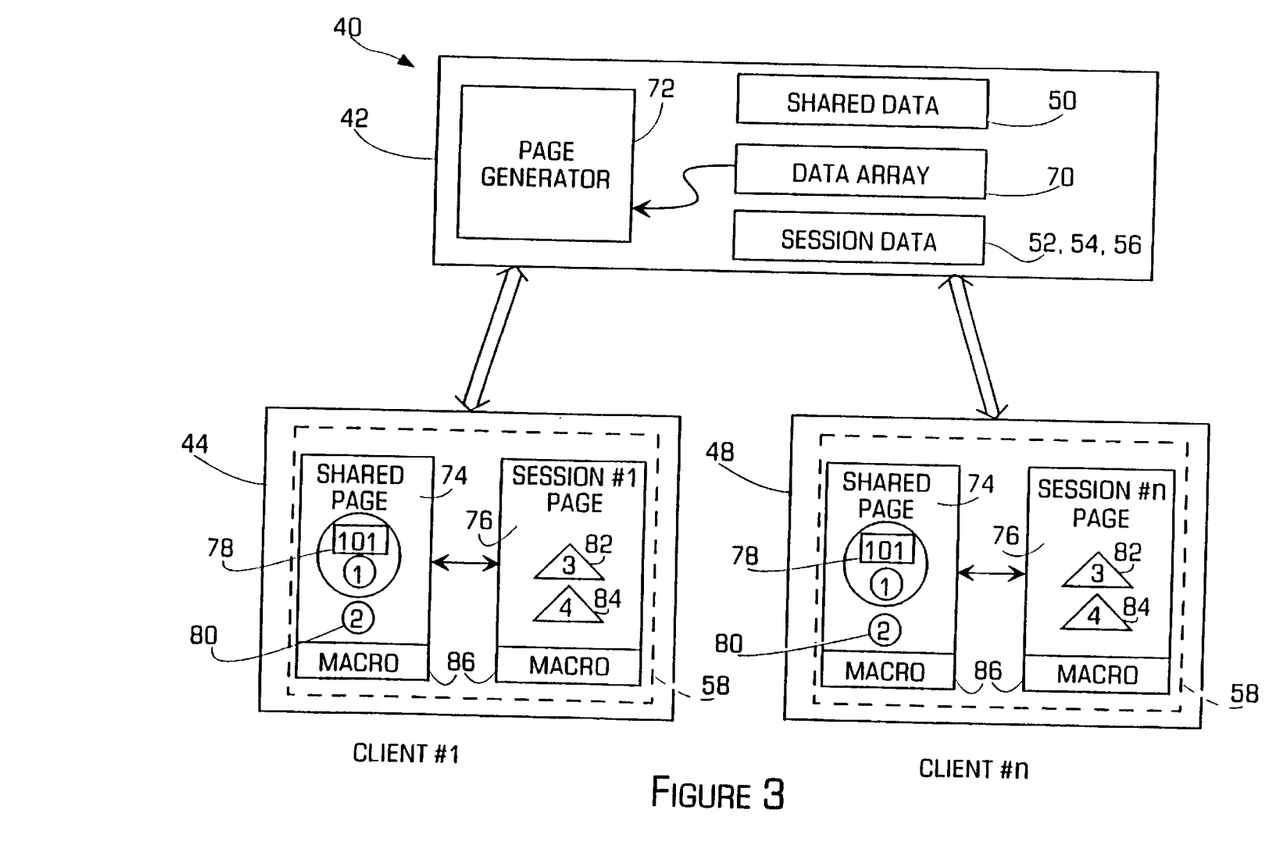
FIG. 3 is a more detailed diagram of the client-server system of FIG. 2.

FIG. 3 is a more detailed diagram of the client-server system 40 that may include the server computer 42. For clarity, only two client computers, client computer number 1, 44 and client computer number N, 48, are shown. As described above, in accordance with the invention, the application logic, the shared data structures 50 and session data structures 52, 54, 56 are located on the server while the client software application 58 may be a simple user interface. To keep track of the shared data and the session data for each client computer, a data array 70 may be located on the server computer and will be described below with reference to FIG. 4. Each data item within the data processing system may have a data structure associated with it. The data structure may be displayed on a page as a data field or a table. Each shared data item may have a particular data structure and the value of the data within the data structure may be the same for every client computer session. For each session data item, the data structure of the session data item may be the same, but it is unlikely that the value of the data in the data structure will be identical since the session data for each client computer may be different so that separate temporary storage for each session data item for each client computer is necessary. Therefore, the data array may keep track of the temporary storage locations for each session data item for each client computer and ensure that each client computer uses the same value for the shared data. Therefore, the data array permits each client session to have a separate copy of each session page with unique session data item values that are temporarily stored until the client session is completed and the session data is transferred back into the shared data item. The output of the data array, which may be a list of the storage locations of the shared data and the session data for each client session are used by the invention to fill in the data fields in the graphical shared pages and graphical session pages. The system may also provide a development environment for a developer who may generate a template for each page including data fields and associated data structures and the data may be filled into the template by a macro. A development environment in accordance with the invention that permits a developer to generate these shared and session pages as well as any macros attached to these pages will be described below with reference to FIGS. 5 and 6.

The pages may be laid out, in accordance with the invention, using a graphical development environment and then a page generator unit 72 may generate the pages based on input from the data array 70. A template for a shared page 74 that is shared by each client session, but usually not viewed by any client, may be generated by the server, downloaded to the client computer, and displayed on each client computer using the client application 58, that may be a JAVA-based user interface. A template for a session page 76 may also be generated by the server computer, downloaded to the client computer, and displayed on each client computer. The order that the pages are downloaded to the client computer depends on the user's choices. In addition, the number of shared pages and session pages in an application depends on the particular data processing application. For this example, two pages are shown, however, a more complex data processing application may have multiple hierarchically organized session pages. The pages may be linked together so that a user of the client computer may move between the pages. Often, a user of the client computer may not have access to and may not see the shared data page, but it is shown here to illustrate the interaction between a shared data page and a session data page. Each shared page template may have the same data structures and data fields so that for example, the template of the shared page 74 may have a first shared data field 78 and a second data field 80, for example. In the shared pages, each of the data fields and the underlying data structure contains the same value for each client computer because the data is shared between all of the client computers. For example, the shared data structure may be a hierarchically data structure, such as an array, that contains data for everyone and then data for each person may be extracted from the shared data item to become session data items on the session pages. Thus, a shared page stores all of the data similar to a backend of a conventional client-server system. In the session pages 76, there may be, for example, a first session data field 82 and a second session data field 84. The session data fields have data structures that are identical for each session page on each client computer, but the different. For example within the fields may be different. For example, in a employee benefits data processing system, the selections by an employee relating to retirement investment and a health care plan would be session data that may have a different value for each client computer because one employee may choose a Health Maintenance Organization health plan while another employee may choose a more traditional health insurance plan. Any changes made to these session data items may be immediately stored in the shared data item.

Each page displayed on the client computer may also have a macro 86 associated with the page or with a data field, that may be a field or a table. The macro may perform certain data processing functions, such as adding values and placing the sum in another field, retrieving a shared data value from a shared page or periodically updating retrieved shared data to ensure that it is valid. The macros may be generated, in accordance with the invention, while the pages are being generated and will be described below with reference to FIGS. 5 and 6. As shown, the data processing system comprises one or more pages, that may be session pages or shared data pages, and macros may be attached to events occurring on the pages, such as a user action, and other data structures that permit a user to access the data processing system and perform some selections. The session pages give the user the illusion that the user is using a traditional client software application that is being executed by the client computer. Instead, the session page is being executed by the server computer and any changes made by the user are communicated directly back to the server computer.

The distributed data processing system in accordance with the invention stores the shared and session data on the server computer and also executes the application logic on the server computer. The client software application may be simply a user interface. The storing of the shared data, the session data, and the application logic including macros, on the server computer in accordance with the invention provides several advantages. The system in accordance with the invention stores the entire application, including the data structures, all data processing programs logic, and user interface elements as a series of pages that may be linked together by macros and generated in a single graphical development environment. In accordance with the invention, a developer may simply generate a new page, a nested structure on the page and the system may automatically generate the data structures required the store the user's data, as described below. In a conventional client-server system, by contrast, a developer of a client-server product may need to be able to program in several different programming environments, such as the SQL database environment, a PERL, Cobol or C programming environment to generate the application logic, and the HTML environment to create the user interface.

The system in accordance with the invention has a unified system in which both the data and application logic are stored on the server, the shared pages act as the back-end data depository, and the session pages are unique for each new session started by a client computer. Thus, shared and session data items are linked together and may be accessed without using a transaction request. A shared data item may be easily retrieved and any updates to any shared data items may be automatically propagated through the system to each client computer that is currently connected to the server. For example, when a shared data item changes, the change will be automatically propagated through each page that contains or references that data item. In addition, a calculated field that may have a value based on shared data items values may be automatically updated to reflect changes. Thus, whenever the client computer requests updates, the calculated value will be automatically updated without any user interaction. In a traditional system, most of the processing of the data is done by the application on the client computer, and communication of data with the server, known as a transaction, is minimized. The transaction related to a user action may not occur immediately after the user interaction and necessitate the revalidation of data. In the system in accordance with the invention, all user interaction are communicated with the server, and all interactions are treated as sequentially. By contrast, a traditional client-server system has a separate front end, such as the client application that includes application logic, and a back end, such as a dumb data repository that may consist of tables and limited programming logic to maintain the integrity of the data located in the data repository.

In the system in accordance with the invention, the application logic stored on server may be created by placing data structures on a series of pages and then binding the pages together with transaction macros. As described above, all of the application logic and data are stored and executed on the server, and the client computer has a thin client application with a user interface that permits the user to interact with the application and manipulate the data. In a conventional client-server system, the data structures are completely separate from the application design. The data structures must be generated using a utility in the SQL database, and then these data structures are referenced by an SQL transaction issued to the server by the client application. The client application must distinguish between session data and shared data and then issue transactions to the server when shared data is being changed.

Now, the operation of the data processing system in accordance with the invention will be briefly described. As a client computer connects to the server and begins a client session, the server computer may generate a new data array, as described below, for that client session to provide temporary storage for session data values for that client session. Then, a first template of a graphical page of the system may be generated by the server and transmitted to the client computer and the client computer may display the page on its display. The user of the client computer may now interact with the page, view the data and possibly change the data values. Any time that data is changed for a particular client session, those changes may be immediately transmitted back to the server and stored in a shared data item, as described below. The temporary storage of the session data items may be deleted and the data array for the client session deleted. Once the client session has been completed, the pages are no longer displayed on the client computer and the client session is complete. Now, a more detailed description of the data array, in accordance with the invention, that permits a separate session page for each concurrent session to be generated, will be described.

Figure 4:
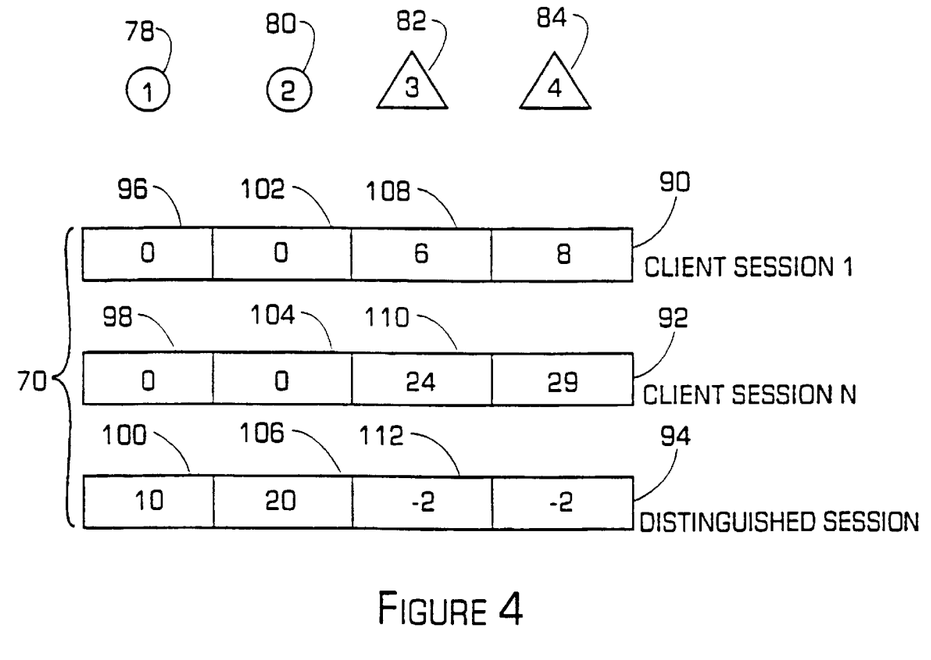
FIG. 4 is a diagram illustrating a data array, for the data items of FIG. 3, in accordance with the invention.

FIG. 4 is a diagram illustrating a preferred data array 70 for the system 40 of FIG. 3. Because all session and shared data may be stored on the server in accordance with the invention, a separate copy of each session page is required for each concurrent client session. To create these multiple separate copies of the session pages and keep track of the session data, a data array is provided in which each data item located on a page may be assigned a data item number. Each data item may be a shared data item or a session data item depending on whether its on a shared page or a session page. For each concurrent client session, a session data array may be generated that has an element for each data item. Each element may contain an offset value (memory location) indicating where the data is stored within the database. The data array may dynamically allocate and deallocate memory space for each client computer's session data and track the shared data as well as the session data. As a sessions started, a new data array may be created and memory space allocated for each data item for the session. Then, when a particular session is completed and the session data has been stored in a shared data item, the memory allocated to the session data items is returned to a memory pool and the data array for that particular client session is deleted. The shared data may be stored in a shared data database 50 in the server computer. The session data for a particular client session does not need to be stored because it is already stored in the shared data item.

By contrast, in a traditional client-server system, the session state for each client session is stored on the client computer so that a data array is not required. In the example shown, there may be a first session data array 90 for tracking the shared and session data for client computer 1, a second session data array 92 for tracking the shared and session data for client computer N, and a third distinguished data array 94 that differentiates between the shared data and the session data, as described below. As more client computers are connected to the server computer additional session data arrays will be added for each client computer. To better understand the data array of FIG. 4, an example of a set of data arrays for the shared and session data item from FIG. 3 are described. The shared data 78, 80 may be symbolized as a circle with a number it in while the session data 82, 84 may be symbolized by a triangle with a number in it.

For the shared data 78, 80, elements 96, 98, 102, 104 for each client computer may contain a zero indicating that the data is shared data that has the same value for each client computer session. For the first shared data item 78, elements 96, 98 in the data arrays for the two client computers are zero. An element 100 in the third data array 94 may contain the memory location where the shared data is stored in the server computer. In this example, the first shared data item is stored in memory location 10. Similarly, for the second shared data item 80, the elements field 102, 104 in the data array for each client computer may be zero indicating a shared data item and the third array 94 may contain an element 106 that may contain the memory location of the second shared data item 80. Thus, for shared data, the third distinguished array 94 may provide an offset value indicating the memory location of the shared data for each client session.

For the session data 82, 84, wherein the value of the value of the session data may be different for each client computer, the elements within the data arrays 90, 92 may contain the memory locations of the value of the session data for that particular client computer. For the first session data item 82, the first array 90 for the first client computer may have an element 108 indicating the memory location of the value of the session data for that client computer. Similarly, in the second data array 92 for the client computer N, an element 110 may indicate the memory location of the value of the session data for that particular client computer. For session data, the value for each piece of session data is stored on a separate memory location. An element 112 in the third data array 94 may indicate that the data is session data. In this example, the third data array may store a "−2" to indicate a session data item. Similarly, for the second session data item 84, the first and second array 90, 92 may contain the memory locations of the session data items and the third array 94 may indicate that the data is session data. When a transfer of data for a particular client session is processed, references to data items may be resolved by looking at the distinguished data array to determine if the data item is shared. If the data item is shared, the memory location may be read from the distinguished data array, otherwise, the memory location may be read from the session data array for each particular client session.

When a new session is initiated, a new session data array may be generated wherein all of the elements are reset to "0" except for any shared data items. The zeros indicate that the corresponding data item do not currently contain a value. When a value is added to a data item, file storage may be dynamically allocated for the data item and a file offset may be stored in the appropriate element in the data array. The memory for each data item may be allocated in memory blocks and the memory blocks for a client session may be linked together so that, when a session is completed, all of the blocks for the session may be returned to the memory and then reallocated to another client session.

The data array permits the system to distinguish between shared data items and session data items. As additional client computer are connected to the server computer, additional data arrays for each client computer are added in order to allocate memory space for the new client computer session. As client computers are disconnected from the server computer, the data arrays for disconnected client computers are erased so that any memory space allocated to those disconnected client computers may be reallocated to another client computer, but the shared data for that client computer is maintained in the hard disk of the server computer and in the shared data items. When a client computer reconnects to that server computer, a new data array may be generated for that reconnected client computer and memory space within the memory of the server computer may be reallocated. Therefore, the data array also manages the memory space in the server computer and allocates that memory space according to the number of client computers connected to the server computer. Now, the generation of the session pages, the shared pages, and the macros in accordance with the invention will be described.

Figure 5:
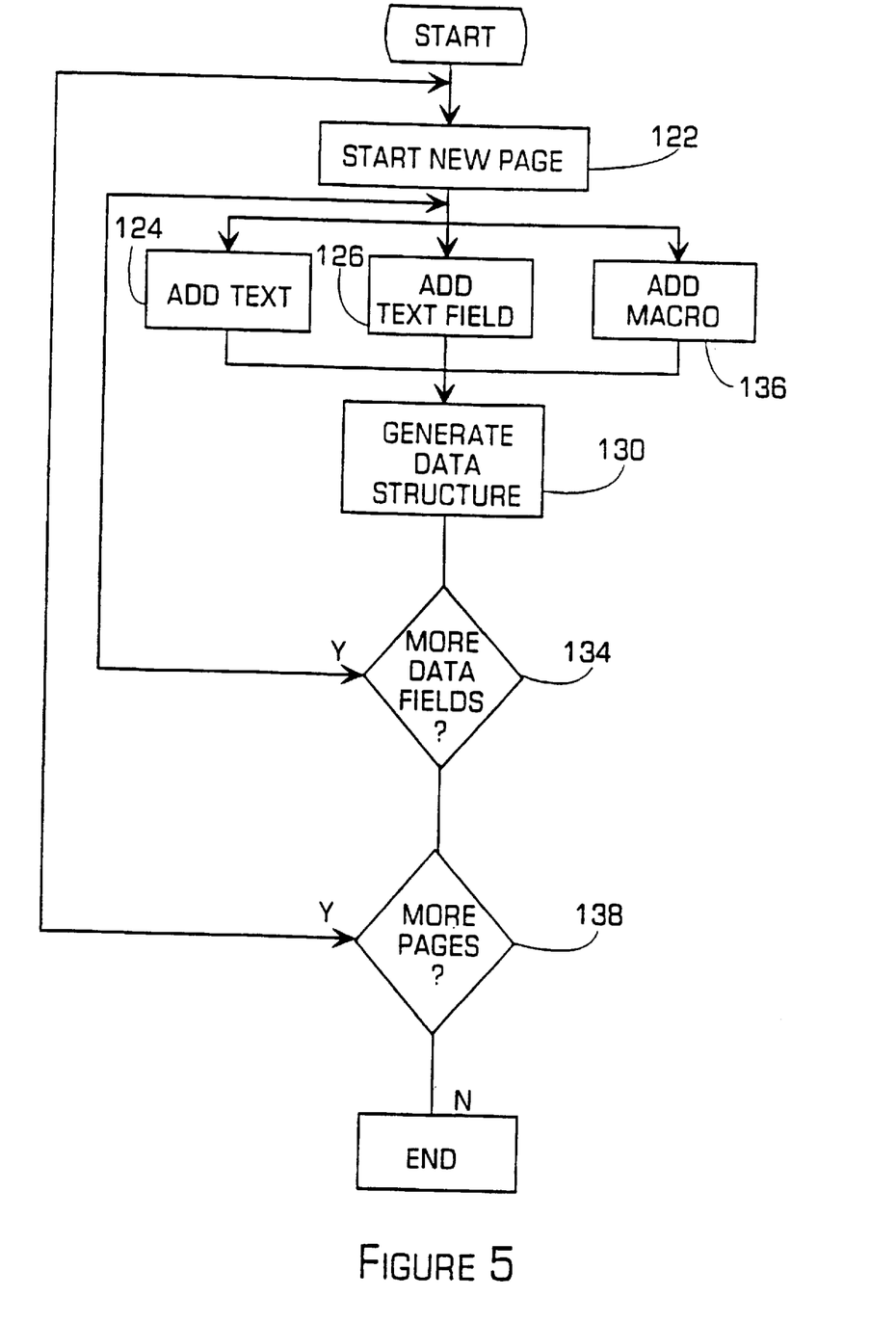
FIG. 5 is a flowchart showing a method for generating a client-server application in accordance with the invention.

FIG. 5 is a flowchart of a method 120 for generating a client-server system comprising one or more shared data pages, one or more session data pages, and macros in accordance with the invention. A graphical development environment that may be used for generating the pages in accordance with the invention will be described below with reference to FIG. 6. In addition to the client/server applications described above, the distributed data processing system in accordance with the invention may also have a development environment that permits a developer to easily generate the pages and macros. The method described below generally follows the sequence of steps for generating a client-server application in accordance with the invention and may be implemented by a software application being executed by the server computer. In step 122, a tool may be used to begin generating a new page, that may be either a shared page or a session page. The next steps 124, 126, 136 may occur in any order and are shown as a branch in the flowchart. In step 124, text may be added to the new page using a text generation tool. A data field or table may be placed on the new page in step 126 by simply clicking a tool on the graphical user interface of FIG. 6, that generates a new data field and places the data field on the page. The system may then assign the data field that property of the page it is located on so that, for example, data items on shared pages are shared data items. If the data is shared data, then in step 130, the client/server system may automatically generate the appropriate data structures to hold the shared data. If the data is session data, the client/server computer system may automatically generate an appropriate data structure for the session data. After the data structures have been automatically generated, additional data structures may be generated in step 134 and the method goes back to step 126. If there are no additional data structures to be added, macros may be generated in step 136. The macros may be added by selecting a macro tool in the development system. The macros, executing on the server, may perform calculations or modify on the data or may move data between the pages stored in the server computer. An example of the macros will be described below with reference to FIGS. 7–10. Next, in step 138, additional pages may be added to the client/server application and the process loops back to step 122 or the client/server application may be completed. Thus, using the development environment in accordance with the invention, a developer of a client-server system may graphically lay out the shared and session pages, including the data fields, and generate the macros. Now, an example of a graphical interface to a development environment will be described.

Figure 6:
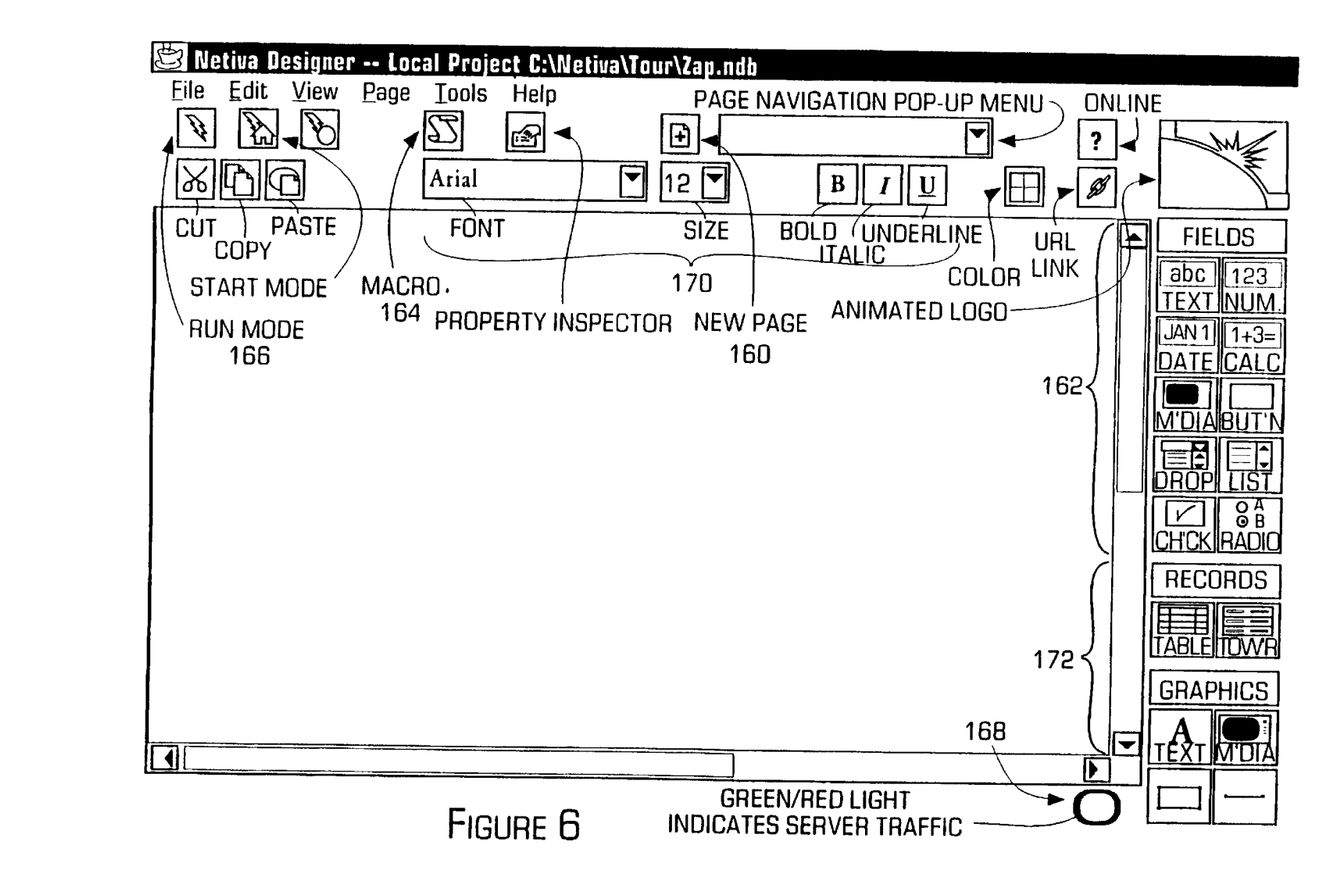
FIG. 6 is a diagram illustrating an example of distributed data processing system generation application in accordance with the invention.

FIG. 6 is a diagram illustrating a preferred graphical user interface (GUI) for a development environment which may be used to generate a client-server application, including shared pages, session pages, and macros. The GUI may be created by well known software application techniques in order to display graphical items, such as a button, that may permit a user to interact with the computer software. As shown, the GUI may include a typical graphical user interface that permits a person to point and click on a particular tool in order to generate a page, a data field, a macros, or the like. A new page tool 160, data field tools 162 and a macro tool 164 on the GUI are shown. The development environment may also permit a developer to test a client-server application with a run mode button 166 and a indicator 168 that indicates communication between a client and the sever. The development environment may also include standard tools for changing the attributes of a font 170 (i.e., size, font type) or for adding graphics 172 to a page. Thus, the development environment permits a developer to create and test a client-server application. The development environment, as described above, also automatically generates the data structures for the shared and session data once a data field is placed on a page. The macros may be generated by simply clicking on a macro button that may generate a macro edit screen that permits a developer to create macro language, submit the macro language to the server, and ultimately create a macro. The macros, which may be program fragments, may be attached to any of the pages created by the developer and may cause data to move between the various pages. An example of the macros generated will be described below with reference to FIGS. 7–10. Now, an example of a client/server system in accordance with the invention will be described with reference to FIGS. 7–10.

Figure 7:
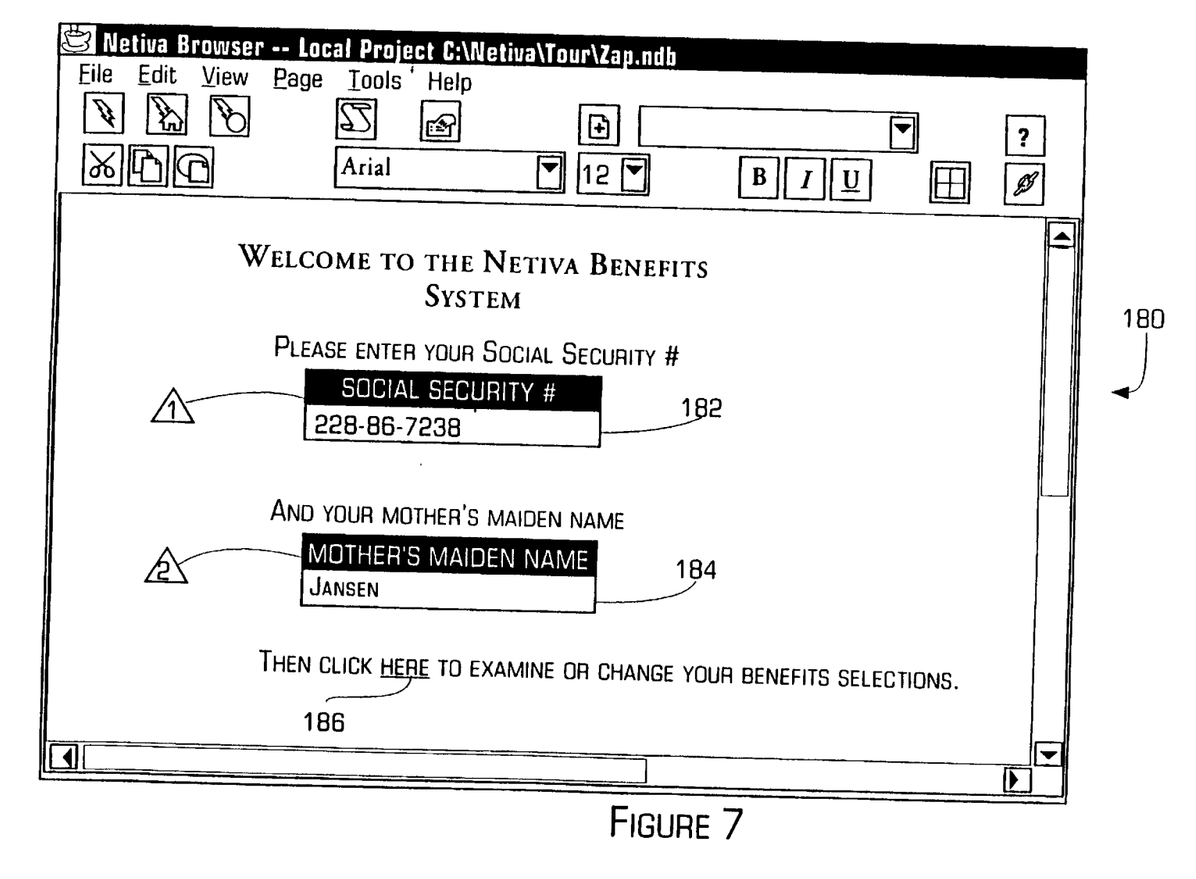
FIG. 7 is an example of a home page of a client-server application that may contain session data in accordance with the invention.

FIG. 7 is a diagram illustrating an example of a home page 180 of a client-server system in accordance with the invention. The home page may be the first page of the client-server system in accordance with the invention, that is displayed on a client computer at the beginning of a client session. The example of the client/server system illustrated in FIGS. 7–10 may be for an employee benefits system that permits employees to view and change their selection of employee benefits over an intranet network within a company. In this example, the home page may be a session data page that may contain session data items. As described above, the session page may appear to a user to be an application being executed by the client computer. This session data page may be generated using the development environment described above. The session page may contain some text and legends instructing the user of the client/server system. The session page may also have a first session data item 182 and a second session data item 184. In this example to better illustrate the session data items and the shared data items, the session data items may be indicated by a triangle, while the shared data items may be indicated by a circle. In the example, the first session data item may be a social security number of the user, and the second session data item may be the user's mother's maiden name. Once the user has entered the appropriate data in these fields, the user may click on a hyperlink 186 that may display a second page to the user. This hyperlink is unlike a typical world wide web hyperlink that takes a user to a new web page because this hyperlink causes a second page of the client-server application to be displayed to the user of the client computer. In this example, the second page of the client/server application may be another session page entitled "Benefits Election" that may permit an employee to view and possibly change his/her benefits selections.

Figure 8:
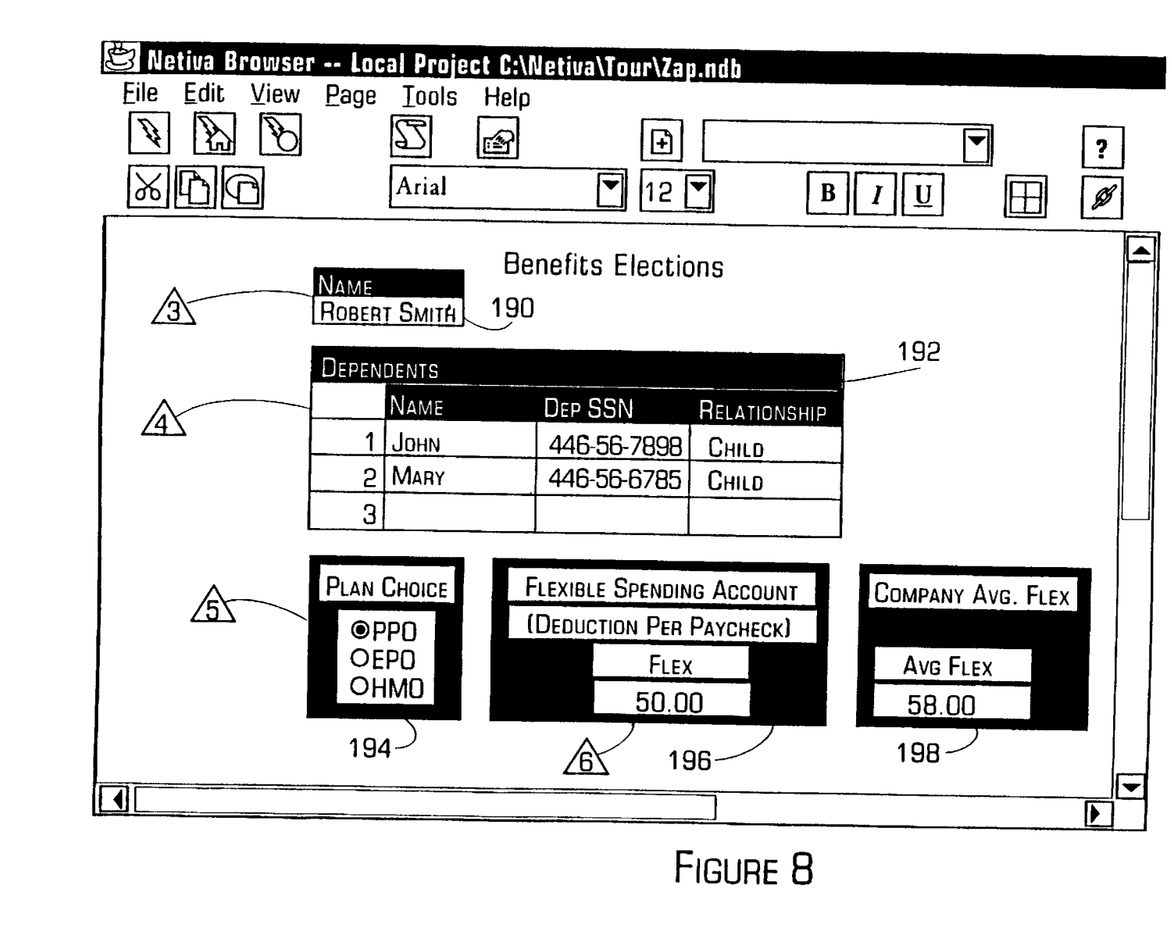
FIG. 8 is an example of a second page of a client-server application that may contain session data in accordance with the invention.

FIG. 8 is a second page 188 of the client/server system that may permit the user to change his/her selections of benefits. Upon arriving at this second page after clicking the hyperlink 186 on the home page, a macro may be executed which may retrieve the data from a shared page, shown in FIG. 9, entitled "Employee Information", as described below. The data may include an employee's dependents, plan choice, and deductions per payment, and the macro may place the data into the fields and tables on the second page. Thus, a majority of the session data displayed on this second page may be retrieved from a shared page that may not be directly accessible by the user. As described below, the shared page may perform the function of the back end data repository of a traditional client/server system. Once the data has been retrieved, the second page 188 may be displayed.

This second page may also be a session page and may contain various session data items that are unique to the user. Each session data item may be indicated by a triangle with a number, wherein each session data item has a separate number. A third session data item 190 may be the name of the employee, a fourth session data item 192 may be a list of the employee's dependents, a fifth session data item 194 may be an employee's selection of the type of health care plan, and a sixth session data item 196 may be an employee's election of a paycheck deduction for the health care plan. Each of these session data items may be unique to each user.

In this example, the current benefits of a particular employee, Robert Smith, are displayed. The employee may now change his dependents, plan choice, and deduction amount as he wishes. When the user presses the "OK" button, the changed data may be transferred back to the shared page and stored. Thus, any changes to the session data may be updated on the shared page immediately after a change by the user so that the integrity of the data is maintained.

A calculated field 198, may be generated by a macro attached to this second page. The calculated field may be, in this example, the average paycheck deduction made by other employees. The macro attached to this calculated field may contain a formula, such as "Average (Employees Flex)" that may be specified when the developer generates the session page and may calculate the average value of the paycheck deduction for all employees. The value of this calculation depends on shared data and may change due to other employees changing their paycheck deductions while the user is viewing his benefits. Therefore, the calculated value may be updated automatically by a refresh cycle that is periodically requested by the client computer, to obtain the current value of the calculated data value. To refresh the calculated value, the values of the paycheck deductions for all employees may be retrieved and checked and the average may be recalculated if necessary. For a traditional client/server system, showing this average value would require the developer to initiate an SQL query at timed intervals which would slow down the server. The ability to dynamically update calculations based on shared data in accordance with the invention is particularly useful for a client/server purchase order entry system wherein the current inventory of any item needs to be updated to reflect other purchases being made.

Figure 9:
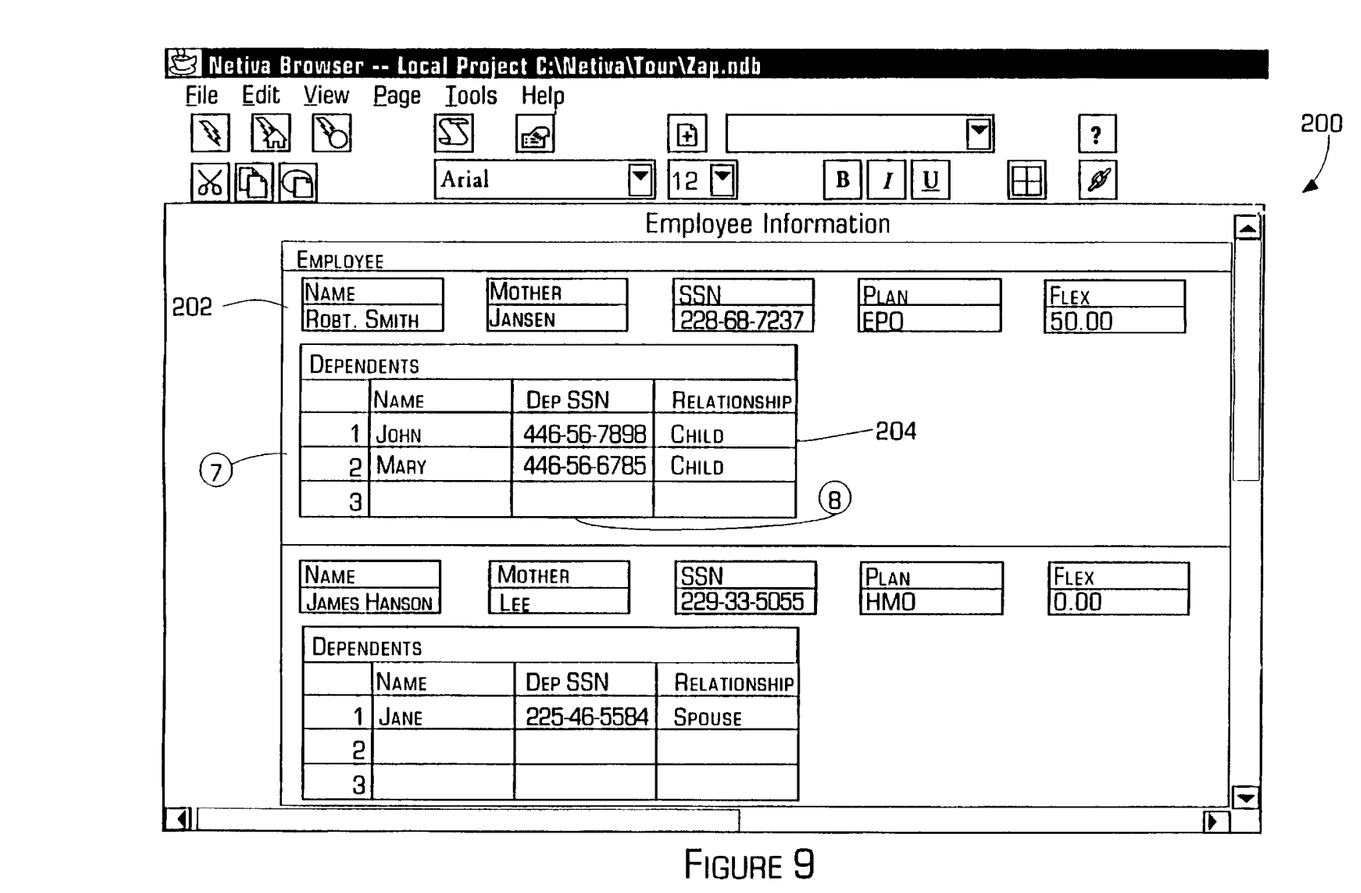
FIG. 9 is an example of a third page of a client-server application that may contain shared data in accordance with the invention.

FIG. 9 is a diagram illustrating a third page 200, that may be a shared data page, of the client server system in accordance with the invention. In this example, the page may be titled "Employee Information". As described above, these shared data pages may not be accessible by the user, but the session pages, described above, may access the session data items contained on the shared page using macros. As shown, the shared page may have a shared data item 202 such as the data for all employees that may have session data, such as the data for each employee nested within the shared data item. The shared data item may have a hierarchical structure wherein session data items (each employee's data) may be stored within the shared data item. For example, when a user enters his/her social security number and mother's maiden name on the first page, the macro attached to the first page may pull the employee's data (session data items) from within the shared data item in the shared page, based on the employee's entries on the first page, and may display those retrieved session data items on the second page. It is undesirable that each user have access to this data structure, but the session data within this shared data item may be retrieved with a macro and displayed on a session page. The shared data page may also have an eighth data item 204, that may also be a shared data item and may contain the list of dependents for every employee. Thus, the shared page may be a data repository, but may be accessed by macros to retrieve session data items.

An example of the implementation of the macros for the above-described sessions pages will now be described. The macro for the home page 180, may be triggered when a user goes to the second page 188. As described above, the macro may fill in the Benefits Election page with data specific to the employee. The macro may comprise a single command:

ADD Employees to Benefits Elections where Employees.SSN=Home.Page SSN and Employees.Mother=Home-Page.Mother so that, based on the social security number (SSN) and mother's maiden name entered by the employee in the Home Page, the session data items for the employee are retrieved from the shared page and placed in the appropriate fields in the session page.

For the macro attached to the second page 188 that calculates the average paycheck deduction, the macro may be executed when a user clicks an "OK" button after examining the elections and making any changes. The macro may be implemented as:

UPDATE Employees Form Benefits Election
MATCHING Name=Benefits Election.Name that transfers session data values from the Benefits Election page 188 back to the shared data page. For both macros, in a practical application, the macro may perform validity checks on the modified session data items. For example, the employee's paycheck deduction may be checked against some limit. The macros may also have some logic to handle when, for example, session data typed into the home page 180 by the user is invalid. Now, a data array for these three pages in this example will be described.

Figure 10:
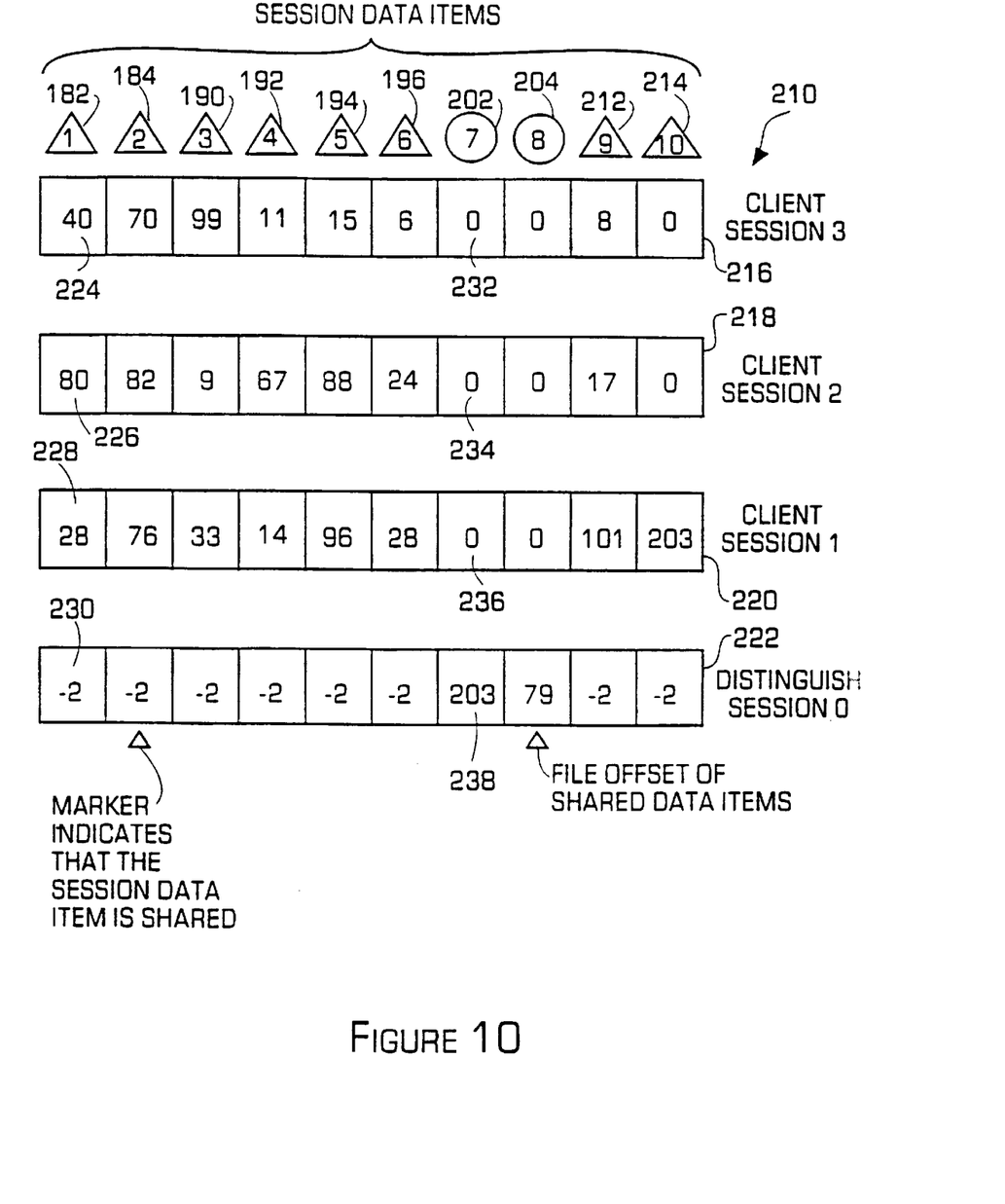
FIG. 10 is an example of a data array that tracks the data items displayed on the graphical pages shown in FIGS. 7–9.

FIG. 10 is a diagram illustrating a data array 210 for the system having the first page 180, second page 188 and shared page 200 as shown in FIGS. 7–9. The data array may have an element for each data item in the pages 182, 184, 190, 192, 194, 196, 202, 204 and also for a variable 212, 214 that may be contained in each macro. As described above, there may be a session data array 216, 218, 220 for each concurrent client session and a distinguished data array 222. An example of the offsets for a shared data item and a session data item will be described. The first data item 182, which is a session data item, may have an element 224, 226, 228 for each client session that contains memory location (offset) for each client session, such as "40" for the third client session. An element 230 in the distinguished data array 222 may contain an indicator, such as "−2" indicating that the item is a session data item. For a shared data item, such as the seventh data item 202, an element 232, 234, 236 for each client session may have an indicator, such as "0", indicating that the data item is shared. An element 238 in the distinguished data array 222 may contain the memory location, such as "203", of the shared data item. Thus, the memory locations for session data items are allocated during a session and then deallocated once the session is completed because any new session data in the session data items has been added to the shared data items.

The overall operation of the example shown in FIGS. 7–10 will now be described. As the client computer connects to the server, a data array for the client session is generated that may be reset to zero for all of the session data items. The server may also download the home page to the client computer which may display the home page, as shown in FIG. 7. The user of the client computer may enter his social security numbers and mother's maiden name into the specified data fields and click a link. The link moves the user to the second page and simultaneously executes a macro that, based on the social security number and mother's maiden name, retrieves a plurality of piece of session data unique to the user from a shared data item on the shared page. The server may then download the session data and the second page to the client computer which may display this second page with filled-in data fields, as shown in FIG. 8. The user may then view the session data and change any of the session data, such as the number of dependents or the amount of a paycheck deduction. Once the user has completed all of the changes, the user may click a "OK" button and a second macro may transfer the changed session data items back into the shared data item so that the shared data item is updated. The shared data item acts as a data repository and maintains a current copy of all of the session data. Since the session data has been stored within the shared data item, the session data items for the client session are no longer needed. Thus, when the session has been completed, the memory allocated to those session data items may be returned to the memory pool and the data for that particular client session may be deleted.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. A distributed data processing system including a server computer and a plurality of client computers connected to the server computer, the interaction of each client computer with the server computer being a separate client session, the system comprising:

means, associated with the server computer, for storing a plurality of data items including a session data item having a value that is unique for each client session and a shared data item having a value common to each of the client sessions;

means, associated with the server computer, for storing a macro for performing operations on one of the shared data items and the session data items;

means, associated with the server computer, for generating a template comprising a graphical representation of a plurality of data structures and a macro, the template being selected from one of a session template and a shared template, the session template comprising a graphical representation of data structures containing session data items and macros associated with those session data items, and the shared template comprising graphical representations of hierarchical data structures containing shared data items and macros associated with those shared data items;

means, associated with the server computer, for tracking the session data item values for each client session and the shared data item values;

means, associated with the server computer, for transferring the session template to a particular client computer upon starting of a client session between said client computer and the server computer;

means, associated with said client computer, for displaying the session template;

means, associated with said client computer, for receiving changes to the value of the session data item contained on said displayed session template; and means for updating the shared data item values in the shared template based on the user changes to the session data item.

2. The system of claim 1, wherein said session template further comprises a graphical representation of a data structure containing a data item having a value that is determined by said shared data, and the system further comprises means, associated with the server computer, for generating a value of said determined data item based on said shared data items on said shared template, and means, associated with the session template, for periodically updating the value of said determined data item when said shared data item located on said server changes.

3. The system of claim 2, wherein said templates comprises a graphical page having a plurality of graphical representations of said data structures to provide a graphical user interface to the session data items, each client session having a separate session page.

4. The system of claim 3, wherein said tracking means comprises a table having a data array for each client session and an indicator array, the data arrays and indicator array having an element to indicate the memory location for each session and data item.

5. The system of claim 1, wherein said template further comprises means, associated with said session page, for processing said data contained in the session page.

6. The system of claim 5, wherein said processing means comprises means for transferring data from a session page to a shared page.

7. A method for distributed data processing with a system having a server computer and a plurality of client computers connected to said server computer, the interaction of each client computer with the server computer being a separate client session, the method comprising:

storing a plurality of data items on the server including a session data item having a value that is unique for each client session and a shared data item having a value that is common to each of the client sessions;

storing a macro on the server for performing operations on the shared data items and the session data items;

generating a template on the server comprising a graphical representation of a plurality of data structures, the template being selected from one of a session template and a shared template, the session template comprising a graphical representation of data structures containing a data item having a value that is unique for each client session, and the shared template comprising graphical representations of hierarchical data structures containing a data item having a value that is the same for each of the client sessions;

tracking the session data item values for each client session and the shared data item values on the server;

transferring the session template to a particular client computer upon starting of a client session between said client computer and the server computer;

displaying said session template on the client computer;

receiving changes to the value of said session data item contained on said displayed session template; and updating the shared data item values in the shared template based on said user changes to the session data item.

8. The method of claim 7, wherein said session template further comprises a graphical representation of a data structure containing a data item having a value that is determined by said shared data, and the method further comprises generating, at the server, a value of said determined data item based on said shared data items on said shared template, and periodically updating the value of said determined data item when said shared data item located on said server changes.

9. The method of claim 8, wherein said template comprises a graphical page having a plurality of graphical representations of said data structures to provide a graphical user interface to the session data items, each client session having a separate session page.

10. The method of claim 9, wherein said tracking comprises using a data table having a data array for each client session and an indicator array, the data arrays and indicator array having an element to indicate the memory location for each session and data item.

11. The method of claim 7, wherein said template further comprises processing said data contained in the session page.

12. The method of claim 11, wherein said processing comprises transferring data from a session page to a shared page.

13. A server computer for use in a distributed data processing system having a plurality of client computers connected to the server computer, the interaction of each client computer with the server computer being a separate client session, the server comprising:

means for storing a plurality of data items including a session data item having a value that is unique for each client session and a shared data item having a value that is the same for each of the client sessions;

means for storing a plurality of macros for performing operations on the shared data items and the session data items;

means for generating a template comprising a graphical representation of a plurality of data structures, the template being selected from one of a session template and a shared template, the session template comprising a graphical representation of data structures containing said session data items and associated macros, and the shared template comprising graphical representations of hierarchical data structures containing shared data items and associated macros;

means for tracking the session data item values for each client session and the shared data item values;

means for communicating the session template to a particular client computer upon starting of a client session between said client computer and said server computer so that the client computer displays said session page; and means, in response to changes in the data at the client computer, for updating the shared data item values in the shared template based on said user changes to the session data item.

14. The server of claim 13, wherein said tracking means comprises a data table having a data array for each client session and an indicator array, the data arrays and indicator array having an element to indicate the memory location for each session and data item.

15. A client computer for use with a distributed data processing system having a plurality of client computers connected to a server computer, the interaction of each client computer with the server computer being a separate client session, each client computer comprising:

means for receiving a template from the server computer, the template comprising a graphical representation of a plurality of data structures, the template being selected from one of a session template and a shared template, the session template comprising a graphical representation of data structures containing a data item having a value that is unique for each client session and associated macros, and the shared template comprising graphical representations of hierarchical data structures containing data having a value common to each client session and associated macros;

means for displaying said session template downloaded from the server computer;

means for receiving changes to a value of the data on said displayed session template based on user input; and means for communicating changes to the server computer in order to update the shared data item values in the shared template based on said user changes to the session data item.

* * * * *